United States Patent [19]

Murphy et al.

[11] 3,935,707

[45] Feb. 3, 1976

[54] HYDRAULIC CONTROL SYSTEM

[75] Inventors: Eugene Scott Murphy, Portage; Clyde Bennett Stevens, Kalamazoo, both of Mich.

[73] Assignee: General Signal Corporation, Rochester, N.Y.

[22] Filed: July 22, 1974

[21] Appl. No.: 490,629

[52] U.S. Cl. .................... 60/444; 60/445; 60/447; 417/24; 417/218

[51] Int. Cl.² .................... F16D 31/02; F04B 49/00

[58] Field of Search ............ 60/444, 445, 447, 449, 60/450, 452; 417/212, 213, 218, 222, 24

[56] References Cited

UNITED STATES PATENTS

| | | | |
|---|---|---|---|
| 2,888,810 | 6/1959 | Hann | 62/215 |
| 3,002,462 | 10/1961 | Raymond | 417/214 |
| 3,152,445 | 10/1964 | Weisenbach | 60/450 |
| 3,188,971 | 6/1965 | Puryear | 417/222 |
| 3,214,911 | 11/1965 | Kempson | 60/444 |
| 3,477,225 | 11/1969 | Cryder et al. | 60/450 |
| 3,660,975 | 5/1972 | Martin et al. | 60/447 |
| 3,672,166 | 6/1972 | Isaac | 60/447 |
| 3,785,754 | 1/1974 | Miller | 60/444 |
| 3,788,773 | 1/1974 | Van Der Kolk | 60/444 |

*Primary Examiner*—William L. Freeh
*Assistant Examiner*—G. P. LaPointe
*Attorney, Agent, or Firm*—Harold Huberfeld; Jeffrey S. Mednick

[57] ABSTRACT

A hydraulic control system includes a generating circuit for providing power to a work function. A driving apparatus operates the generating circuit. A control circuit is connected to the generating circuit and the driving apparatus for permitting delivery of power to the work function when the driving apparatus is operating up to a predetermined speed. The control circuit also stops delivery of power to the work function when the driving apparatus runs above the predetermined speed.

36 Claims, 1 Drawing Figure

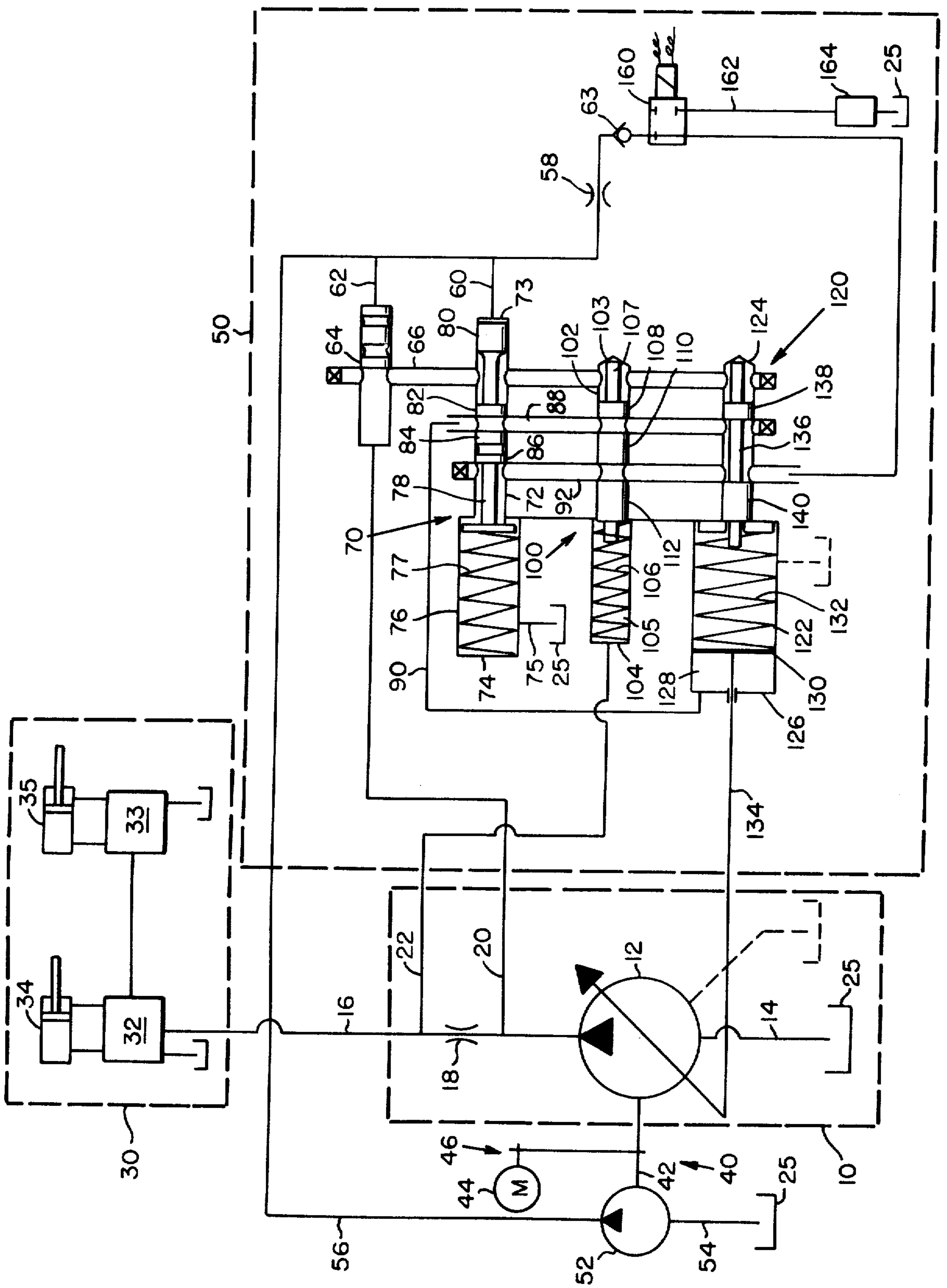

HYDRAULIC CONTROL SYSTEM

BACKGROUND OF THE INVENTION

While the invention is subject to a wide range of applications, it is especially suited for use in a hydraulic circuit required in a vehicle and will be particularly described in that connection. In hydraulic systems for vehicles, such as, for example, a refuse truck, the general practice is to have a hydraulic circuit for performing work functions such as, for example, compressing the refuse or raising the back to unload. The circuit many include an actuator which is powered by fluid delivered from a fixed displacement pump being operated by the main engine of the vehicle.

When the vehicle is not moving, the engine may idle at approximately 1000 revolutions per minute (rpm) and the pump is geared to a drive shaft from the engine such that the pump may rotate at a higher speed, such as, for example 3000 rpm. When the vehicle starts to move, the engine begins operating at a higher speed, such as, for example, 3000 rpm and the pump speed correspondingly increases to approximately 9000 rpm.

When the pump is operating at such a high speed, it is displacing a large quantity of hydraulic fluid. This fluid is not needed when the hydraulic functions are not being performed, such as when the vehicle is moving. Since the fluid acts against a closed actuator valve, the pressure in the system drastically increases. The pressure may be relieved by a relief valve to a reservoir. The flow of hydraulic fluid across a pressure drop as created by the relief valve causes a horsepower loss. The resulting loss in efficiency means that additional fuel is required to operate the engine of the vehicle. Since fuel may be expensive, minimizing inefficiency is very important.

Another problem with running the pump at high speed is that it creates a great deal of noise. Since a refuse truck is operated in a residential area, the noise factor is important as it may be quite disturbing to the residents of the area.

Another consideration in operating a pump at a high speed and against a heavy load is that it may wear out in a shorter period of time. Increasing the frequency of pump repair adds to the expense of operating the equipment and may cause costly time delays when the vehicle is being repaired.

It is an object of the present invention to provide a hydraulic system which has a relatively low horsepower loss.

It is a further object of the present invention to provide a hydraulic system which has a quiet operation.

It is a further object of the present invention to provide a hydraulic system which has increased reliability.

It is a further object of the present invention to provide a hydraulic system which is relatively inexpensive to operate.

SUMMARY OF THE INVENTION

In accordance with the present invention, a hydraulic control system includes a generating circuit for providing power to a work function. A driving apparatus operates the generating circuit. A control circuit is connected to both the generating circuit and the driving apparatus for permitting the delivery of power to the work function when the driving apparatus is operating up to a predetermined speed. The control circuit also stops delivery of power to the work function when the driving apparatus is running above the predetermined speed.

To be more specific, a hydraulic control system may include a variable displacement pump for providing hydraulic fluid to a work function and a driving apparatus for operating the variable displacement pump. The improvement comprises a control circuit connected to both the variable displacement pump and the driving apparatus for permitting the delivery of fluid to the work function when the driving apparatus is operating up to a predetermined speed. The control circuit also stops delivery of the hydraulic circuit to the work function when the driving apparatus is running above the predetermined speed.

For a better understanding of the present invention, together with other and further objects thereof, reference is made to the following description, taken in connection with the accompanying drawings, while its scope will be pointed out in the appended claims.

BRIEF DESCRIPTION OF THE DRAWINGS

The FIGURE is a schematic illustration of the present invention.

DESCRIPTION OF THE PREFERRED EMBODIMENT

A hydraulic control system includes a generating circuit 10 for providing power to a work function area 30. A driving apparatus 40 operates the generating circuit 10. A control circuit 50 is connected to both the generating circuit 10 and the driving apparatus 40 so as to permit the delivery of power to work function area 30 when driving apparatus 40 is operating up to a predetermined speed. Control circuit 50 alos stops the delivery of power to work function area 30 when driving apparatus 40 is running above the predetermined speed.

Referring to the FIGURE there is shown a schematic illustration of a hydraulic control system having the components which may be utilized in practising the invention. A generating circuit 10 may include a variable displacement pump 12, of the axial piston variable displacement type, such as, for example, a Dynapower Horsepower Limiter Model No. 30, Part No. 892826, manufactured by New York Air Brake Co., a Unit of General Signal Corporation. Pump 12 receives fluid from a line 14 which is connected to a reservoir 25. The fluid from pump 12 is discharged into a power line 16 which is connected at its downstream end to work function area 30.

Work function area 30 may include two or more pressure compensated control values 32 and 33 of the type disclosed in U.S. Pat. application Ser. No. 392,901 filed Aug. 30, 1973 now U.S. Pat. No. 3,878,679. Compensated control valves 32 and 33 deliver fluid to actuators 34 and 35, respectively. However, the present invention is not limited to pressure compensated control valves and may include any valve which can supply fluid to an actuator and thereby do work.

A primary restrictor 18 is located in power line 16 for restricting the flow of hydraulic fluid to work function area 30. A signal line 20 is connected to power line 16 upstream of primary restrictor 18. A signal line 22 is connected to the primary line 16 downstream of primary restrictor 18.

Driving apparatus 40 includes a shaft 42 which is connected to a conventional vehicle engine 44 by a linkage 46. Linkage 46 includes conventional gearing which permits engine 44 to rotate shaft 42 at a speed which may be, for example, three times the rpm of engine 44. Shaft 42 rotates variable displacement pump 12 whenever the engine is turning. When engine 44 is idling, the speed that shaft 42 rotates is the predetermined speed within the terms of the specification. However, it is understood that the predetermined speed might be related to any desired engine speed.

A control circuit 50 includes a speed control pump 52 (not illustrated for ease of explanation) of the positive displacement type, such as, for example, a Model TRA distributed by the Tuthill Corp. Pump 52 is also operated by shaft 42 in the same manner as described above for pump 12. Pump 52 receives fluid from reservoir 25 through a line 54 and displaces the fluid into a control line 56.

Control line 56 includes a high speed restrictor apparatus 58, such as, for example, a conventional flow restrictor. Control line 56 is connected to a limiting line 60 located between high speed restrictor 58 and speed control pump 52. A shuttle valve line 62 is located upstream from limiting line 60 and downstream of pump 52. A secondary check valve 63 is located in control line 56 downstream of high speed restrictor 58.

Control circuit 50 also includes a shuttle valve 64 which is connected to an actuating line 66, shuttle valve line 62, and signal line 20. Shuttle valve 64 permits fluid to pass into actuating line 66 from either signal line 20 or shuttle line 62 depending on the pressure in lines 62 and 20.

A high speed shut-off valve 70 is responsive to hydraulic pressure in control line 56 for maintaining variable displacement pump 12 in a zero discharge position when speed control pump 52 is operating above a predetermined speed. High speed shut-off valve 70 includes a shut-off valve body 72 which is connected at one end 73 to limiting line 60 and at the other end 74 to reservoir 25 via a reservoir line 75. End 74 includes a spring chamber 76 which houses a shut-off spring 77 for biasing a shut-off plunger 78 towards end 73. Shut-off plunger 78 includes four lands 80, 82, 84, and 86. Land 80 is acted on by fluid pressure in limiting line 60 to bias plunger 78 towards end 74. When plunger 78 is biased towards end 73, lands 82 and 84 are positioned to permit fluid to flow from a destroke line 88 into a chamber line 90. At that time, land 86 permits fluid to flow from a reservoir line 92, into spring chamber 76 and finally into reservoir 25 via reservoir line 75.

A flow control valve 100 cooperates to adjust the variable displacement pump 12 in response to a differential pressure across primary restrictor 18. The effect is to maintain a constant flow rate across primary restrictor 18. Flow control valve 100 includes a flow control body 102 which is connected at one end 103 to actuating line 66 and at the other end 104 to signal line 22. End 104 includes a spring chamber 105 which houses a flow control spring 106 for biasing a flow control plunger 107 towards end 103. Flow control plunger 107 includes three lands, 108, 110, and 112. When flow control spring 106 biases plunger 107 towards end 103, land 108 is positioned between actuating line 66 and destroke line 88. At that time, land 110 is between destroke line 88 and reservoir line 92 and land 102 is between reservoir line 92 and spring chamber 105.

A pressure control valve 120 is connected to variable displacement pump 12 so as to regulate the pressure of the fluid delivered by pump 12. Pressure control valve 120 includes a pressure control valve body 122. Body 122 is connected at one end 124 to actuating line 66 and at a second end 126 to chamber line 90. End 126 includes a destroke chamber 128 which contains a servo-piston 130. Piston 130 is biased towards second end 126 by a destroke spring 132. Servo-piston 130 is connected to a rod 134 which adjusts the swash plate of variable displacement pump 12. A pressure control plunger 136 has two lands, 138 and 140. When plunger 136 is biased by spring 132 against end 124, land 138 is positioned between actuating line 66 and destroke line 88. At that time, land 140 is between reservoir line 92 and end 126. For reasons described hereinbelow, the width of land 138 is less than the width of destroke line 88.

A conventional two position solenoid valve 160 is located in control line 56. In the illustrated position valve 160 allows fluid from punp 52 to pass into reservoir line 92. When the solenoid is actuated and valve 160 is in a second position, fluid flows from line 56 into relief line 162. The fluid then crosses a conventional variable relief valve 164 and flows into reservoir 25.

The unique features of the present invention can be more fully understood from the following description of its typical operation. Assume that a refuse vehicle is standing still with its engine idling. When the operator desires to compress the refuse, he shifts control valve 32 so as to allow fluid to flow from power line 16 into actuator 34. The rod in the actuator moves a crushing apparatus and compresses the refuse.

Assuming engine 44 of the vehicle is idling at approximately 1000 rpm, shaft 42 may be geared so as to turn variable displacement pump 12 at approximately 3000 rpm. Pump 12 draws hydraulic fluid from reservoir 25 through reservoir line 14 and delivers the fluid at a pressure, such as, for example, 2500 pounds per square inch (psi) into a primary restrictor 18. Restrictor 18 is selected in this example to develop a differential pressure of 200 psi and allow 25 gallons per minute (gpm) to flow into work function area 30. Signal line 20 is then sensing fluid at a pressure of 2500 psi while signal line 22 is sensing pressure of 2300 psi.

During this time, speed control pump 52 is turned by shaft 42 at 3000 rpm. Hydraulic fluid from reservoir 25 is drawn by speed control pump 52 from reservoir line 54 and directed into control line 56. The volume of the flow is low as pump 52 may be rated to deliver 0.4 gpm at 3600 rpm. Fluid in line 56 crosses high speed restrictor 58 which is selected to permit 3 gpm to pass. Thus, when pump 52 is rotating at 3000 rpm, no pressure buildup occurs in line 56 due to choking at restrictor 58. The fluid then crosses check valve 63, solenoid valve 160, reservoir line 92, and finally enters reservoir 25.

Referring to control shuttle valve 64, note that signal line 20 puts 2500 psi on the left side of shuttle valve 64 while control line 56 puts 200 psi into shuttle line 62. Thus, shuttle valve 64 is in a position to allow fluid from signal line 20 to flow into actuating line 66. Hydraulic fluid from control line 56 flows across high-speed restrictor 58, secondary check valve 63, solenoid valve 160, reservoir line 92, spring chamber 76, and into reservoir 25 via reservoir line 75.

The fluid in actuating line 66 crosses high-speed shut-off valve 70 between lands 80 and 82. However, these lands have the same diameter and the flow does not effect shut-off plunger 78.

The fluid continues down actuating line 66 and crosses flow control valve 100 and acts against plunger 107. The pressure on plunger 107 is balanced by flow control spring 106. Flow control spring 106 may be chosen such that it might, for example, balance plunger 107 when a 200 psi pressure differential exists across primary restrictor 18. Thus, the 2300 psi from signal line 22 combined with the 200 psi from the flow control spring 106 acts on land 112 to balance plunger 107 against the 2500 psi from actuating line 66 which is acting on right side of plunger 107.

The fluid in actuating line 66 then enters pressure control valve 120 and acts against land 138. The pressure control plunger 136 is biased against a destroke spring 132 as well as the force of the swash plate associated with pump 12 acting against rod 134. The swash plate is biased at pump 12 to maintain the pressure being delivered by the pump. In this case, pump 12 delivers 2500 psi and the swash plate exerts a force on rod 134 and servo-piston 130 equal to that required to maintain the pump at its operating pressure. The force of rod 134 combined with the force of destroke spring acts against plunger 135 via land 140 to prohibit the pressure in actuating line 66 acting on land 138 to move plunger 136 toward end 126 of pressure control valve 120.

When the system is in the condition described above, it is delivering the proper amount of fluid at the proper pressure to work function area 30.

Next, assume that pump 12 begins delivering at a rate of flow greater than the selected amount, such as, for example, 26 gpm. Then, the differential pressure across primary restrictor 18 increases to a value greater than 200 psi. This change in differential pressure is sensed by flow control valve 100 via signal lines 20 and 22. The pressure in spring chamber 105 of flow control valve 100 is combined with the pressure exerted by flow control spring 106 to try and balance the flow control plunger 107 against the pressure in actuating line 66. However, the increased differential pressure results in plunger 107 moving towards spring chamber end 104 until land 108 allows fluid to pass from actuating line 66 to destroke line 88. At this time, note that land 110 begins to restrict reservoir line 92 and thereby begins to interrupt flow through reservoir line 92. The fluid crossing land 108 has a tendency to flow through destroke line 88 into pressure control valve 120, up reservoir line 92, and into reservoir 25 via reservoir line 75. However, as explained above, the reservoir line 92 is restricted by land 110, and the pressure of the fluid builds up in destroke line 88 and fluid flows through chamber line 90 into destroke chamber 128. Here, the pressurized fluid acts against servo-piston 130 and destroke spring 132 to move rod 134 and thereby destroke variable displacement pump 12. Pump 12 destrokes until its output is reduced to 25 gpm. Thus, pump 12 is very efficient in that it only delivers the amount of flow required by the design of the system. The pressure, developed by variable displacement pump 12, in actuating line 66 which is not great enough to move pressure control plunger 136 against the force from the bias of the swash plate of pump 12 acting through rod 134 combined with the force of destroke spring 132 is the definition of the first value within the terms of the specification.

Next, assume that the operator moves valve 32 into a neutral position so as to stop supplying fluid to actuator 34. The flow to work function area 30 is said to be "dead headed" and pump 12 is operating at full stroke and delivering fluid at an increasing rate of pressure. At this time, rod 134 is positioned so that servo-piston 130 is at the extreme left of its travel. Destroke spring 132 is fully extended and exerts a minimum spring force on pressure control plunger 136.

The pressure in power line 16 downstream of primary restrictor 18 is now equal to the pressure delivered by pump 12. Thus, the pressure delivered to spring chamber 105 via signal line 22 combined with flow control spring 106 maintains plunger 107 in the position shown in the FIGURE against fluid pressure in actuating line 66.

The fluid in actuator line 66 enters a first end 124 of pressure control valve 120 and acts on land 138 to begin to move plunger 136 against the combined force from rod 134 and spring 132 acting on land 140. The pressure in line 16 continues to increase since the flow is dead headed at work function area 30. Since land 138 is slightly narrower than destroke line 88, as described above, the fluid from actuating line 66 crosses land 138 and enters reservoir 25 via reservoir line 92 and thereby relieves the pressure in power line 16. The pressure in line 66 which moves plunger 136 to a position with land 138 opposite destroke line 88 is defined as between the first value and second value within the terms of the specification.

If the pressure in power line 16 continues to increase to a value such as, for example, 4000 psi, the pressure control plunger 136 moves to the left until land 138 blocks actuating line 66 and reservoir line 92. Then the fluid enters destroke line 88 and passes through chamber line 90 into destroke chamber 128. The pressurized fluid drives servo-piston 130 against spring 132. The rod 134 is connected to the servo-piston and adjusts the swash plate of variable displacement pump 12 so as to destroke pump 12. Pump 12 maintains this position until fluid is again required at work function area 30. The pressure of fluid in line 66 which is enough to move plunger 136 to a position where land 138 is between lines 88 and 92 is defined as the second value within the terms of the specification.

Destroke spring 132, between the swash plate of pump 12 and pressure control plunger 136 is provided so that as pump 12 destrokes, the pressure in power line 16 increases so as to maintain the torque to turn pump 12 constant. This constant diving torque follows the equation:

$$T = \frac{C.I.R. \times P}{24}$$

(see Fluid Power Handbook and Directory, 1970-1971, A-21)

where:

$T$ = Torque $C.I.R.$ = Cubic Inch Displacement per Revolution $P$ = Pounds per Square Inch.

By maintaining a constant driving torque for pump 12, the engine requirement for driving the vehicle may, in some cases, be reduced.

Pressure control valve 120 may restrict the maximum value of pressure which pump 12 can deliver. The length of spring 132 may be selected so that when servo-piston 130 compress spring 132, pump 12 is completely destroked at a selected pressure, such as, for example, 3000 psi. At this time, spring 132 begins to move the swash plate to stroke the pump but the pump is immediately destroked due to the high pressure being delivered to valve 120.

The next condition is when the operator increases the speed of the engine, such as, by driving the truck. Speed control pump 52 begins turning at a rapid rate and increases delivery of fluid to line 56. The pressure in line 56 is increasing as the flow is choked down by high speed restrictor 58. When the pressure in control line 56 exceeds 200 psi, the plunger 78 begins to move to the left. This movement is due to pressure acting on the face of land 80 via limiting line 60 being greater than the pressure exerted by spring 77 which is chosen to balance only 200 psi. Movement of plunger 78 to the left permits the high pressure fluid in actuating line 66 to cross land 82 and enter destroke line 88. Note that as plunger 78 moves to the left, land 86 begins to close off reservoir line 92.

The pressure in control line 56 is greater than 200 psi and is able to move shuttle valve 64 to the left against the pressure of fluid in signal line 20. This movement is very rapid because the pressure in line 56 builds up quickly as land 86 blocks off its flow to reservoir 25. The fluid from shuttle line 62 crosses land 82 of high speed shut-off valve 70 and enters destroke chamber 128 to maintain variable displacement pump 12 destroked. Plunger 136 of pressure control valve 120 has moved back to the illustrated position but land 86 of valve 70 blocks flow from destroke line 88 to reservoir 25 via reservoir line 92. Since the pump 12 is not displacing any fluid at this time, only approximately 70 psi is required to maintain servo-piston 130 in a position to keep the pump 12 completely destroked.

Check valve 63 is located downstream of high speed restrictor 58 so as to prohibit fluid from backing up from reservoir line 92 into pump 52. If the pressure in reservoir line 92 is greater than that being displaced by pump 52, the tendency to stop pump 52 might cause damage to pump 52.

In the event that the operator desires to turn off pump 12 at any time, electrical solenoid actuated valve 160 is provided. When the solenoid valve 160 is actuated, it dead heads the flow from control line 56 and increases the pressure to a value, such as, for example, 400 psi. This pressure acts in limiting line 60 against the pressure of shut-off spring 76. However, shut-off spring 76 is able to balance an opposing pressure such as, for example, 200 psi and allows shut-off plunger 78 to move to the left such that fluid from pump 12 crosses from actuating line 66 into chamber line 90 and enters destroke chamber 128 where it causes pump 12 to destroke. Then fluid from control line 56 maintains pump 12 destroked as described hereinabove.

Relief valve 164 is located downstream of solenoid valve 160 between relief line 164 and reservoir 25 to limit the amount of pressure developed by pump 52 when solenoid valve 160 is in its actuated position.

One skilled in the art will realize that there has been disclosed a hydraulic control system that has a relatively low horsepower loss, a quiet operation, increased reliability and is relatively inexpensive to operate.

While there has been described what is at present considered a preferred embodiment of the invention, it will be obvious to those skilled in the art that various changes and modifications may be made therein without departing from the invention, and it is, therefore, aimed in the appended claims to cover all such changes and modifications as followed in the true spirit and scope of the invention.

What is claimed is:

1. A hydraulic control system including:

a generating means for providing power to a work function, including a variable displacement pump for discharging hydraulic fluid into a power line connecting said variable displacement pump to said work function;

a driving means for operating said generating means, including a rotating shaft for operating said variable displacement pump;

a control circuit means connected to both said generating means and said driving means for permitting the delivery of power to said work function when said driving means is operating up to a predetermined speed and for stopping delivery of power to said work function when said driving means is running above said predetermined speed, wherein said control circuit means includes a speed control pump operated by said rotating shaft and connected to one end of a control line, said control line including a high speed restrictor means for restricting the flow of hydraulic fluid from said speed control pump; said control line being connected to both a limiting line located between said high speed restrictor means and said speed control pump and a shuttle valve line located upstream from said limiting line.

2. The system as defined in claim 1, wherein a primary restrictor means is located in said power line for restricting the flow of hydraulic fluid to said work function; said primary restrictor means further includes a first signal line connected at one end to the power line upstream of said primary restrictor and a second signal line connected to said primary line downstream of said primary restrictor means.

3. The system as defined in claim 1, wherein said control circuit means includes a shuttle valve means being connected to an actuating line, said shuttle valve line, and said first signal line for permitting fluid communication between said first signal line and said actuating line when the pressure in the first signal line is greater than the pressure in said shuttle valve line and for permitting fluid communication between said shuttle valve line and said actuating line when the pressure in said shuttle valve line is greater than in said first signal line.

4. The system as defined in claim 3, wherein said control circuit means includes a high speed shut off means being responsive to hydraulic fluid pressure in said control line for maintaining said variable displacement pump in a destroked position when said speed control pump is operating above a predetermined speed.

5. The system as defined in claim 4, wherein said high speed shut-off means includes a shut-off valve body being connected at first end to said limiting line and at a second end to a reservoir, said second end further including a shutoff spring, a shut-off plunger means being biased towards said first end by said shut-off spring and by fluid in said limiting line towards said second end for permitting fluid to flow from a destroke line into a chamber line and from a reservoir line into said reservoir when the force of said shut-off spring is greater than the force of fluid in said limiting line and blocking these flows when the force of fluid in said limiting line overcomes the force of said shut-off spring.

6. The system defined in claim 5, wherein said shut-off plunger means includes a shut-off plunger having four shut-off lands, said first shut-off land is between said limiting line and said actuating line, said second land is between said actuating line and said destroke line, said third land is between said destroke line and said fourth land, and said fourth land is between said third land and said reservoir line when the shut-off plunger is biased toward said first end by said shut-off spring.

7. The system as defined in claim 2, wherein said control circuit means includes a flow control means for adjusting said variable displacement pump in response to a differential pressure across said primary restrictor so as to maintain a constant flow rate across said primary restrictor.

8. The system as defined in claim 5, wherein said control circuit means includes a flow control means for adjusting said variable displacement pump in response to a differential pressure across said primary restrictor so as to maintain a constant flow rate across said primary restrictor.

9. The system as defined in claim 8, wherein said flow control means includes a flow control body being connected at a first end to said actuating line and at a second end to said second signal line, said second end further including a flow control spring for biasing a flow control plunger means towards said first end, said flow control plunger means for permitting unrestricted fluid flow through said actuating line, said destroke line, and said reservoir line when the pressure in said first signal line is less than the combined pressure from said flow control spring and the presssure of fluid in said second signal line for permitting fluid to flow from said actuating line to said destroke line while interrupting the flow through said reservoir line when the pressure of fluid in said first signal line is greater than the combined pressure of said flow control spring and the fluid in said second signal line.

10. The system defined in claim 9, wherein said flow control plunger means includes a flow control plunger having three flow control plunger lands, said first flow control land is located between said actuating line and said destroke line, said second flow control land is located between said destroke line and said reservoir line, and said third flow control land is located between said reservoir line and said second end when said flow control plunger is biased towards said first end by said flow control spring.

11. The system as defined in claim 1, wherein said control circuit means includes a pressure control valve means for maintaining a substantially constant torque for turning said variable displacement pump when the pressure in said actuating line is below a first value, for destroking said variable displacement pump when the pressure in said actuating line is between said first value and a second value and for destroking said variable displacement pump to zero displacement and maintaining this condition with said speed control pump when the pressure in said actuating line is above said second value.

12. The system as defined in claim 9, wherein said control circuit means includes a pressure control valve means for maintaining a substantially constant torque for turning said variable displacement pump when the pressure in said actuating line is below a first value, for destroking said variable displacement pump when the pressure in said actuating line is between said first value and a second value and for destroking said variable displacement pump to zero displacement and maintaining this condition with said speed control pump when the pressure in said actuating line is above said second value.

13. The system as defined in claim 12, wherein said pressure control valve means includes a pressure control valve body, said pressure control valve body being connected at one end to said actuating line and at a second end to said chamber line, said second end comprising a destroke chamber containing a servo-piston being biased towards said second end by a destroke spring, said servo-piston being connected to a rod extending to said variable displacement pump for adjusting said pump, a pressure control plunger means in said pressure control valve body for blocking flow of hydraulic fluid from said first end when the pressure in said actuating line is below a first value for permitting fluid communication between said actuating line and said reservoir line when the pressure in said actuating line is between said first value and a second value, and for permitting communication between said actuating line and said destroke line when the pressure in said actuating line is greater than said second value.

14. The system defined in claim 13, wherein said pressure control plunger means includes a pressure control plunger having two pressure control lands wherein said first pressure control land is located between said actuating line and said destroke line and said second pressure control land is located between said reservoir line and said second end of said pressure control valve body when the pressure in said actuating line is below a first value.

15. The system defined in claim 5, wherein said control line includes a secondary check means downstream of said high-speed restrictor means for prohibiting fluid flow from said reservoir line to said speed control pump when the pressure in said reservoir line is greater than the pressure in said control line.

16. The system defined in claim 13, wherein said control line includes a secondary check means downstream of said high-speed restrictor means for prohibiting fluid flow from said reservoir line to said speed control pump when the pressure in said reservoir line is greater than the pressure in said control line.

17. In a hydraulic control system including a variable displacement pump for providing hydraulic fluid to a work function, driving means including a rotating shaft for operating said variable displacement pump, the improvement comprising:

a control circuit means connected to both said variable displacement pump and said driving means for permitting the delivery of fluid to said work function when said driving means is operating up to a predetermined speed and for stopping delivery of said hydraulic fluid to said work function when said driving means is running above said predetermined speed, wherein said control circuit means includes a speed control pump operated by said rotating shaft and connected to one end of a control line, said control line including a high speed restrictor means for restricting the flow of hydraulic fluid from said speed control pump, said control line being connected to both a limiting line located between said high speed restrictor means and said speed control pump and a shuttle valve line located upstream from said limiting line.

18. The system as defined in claim 17, wherein a power line connects a variable displacement pump to said work function, a primary restrictor means is located in said power line for restricting the flow of hydraulic fluid to said work function, said primary restrictor means further includes a first signal line connected at one end to said power line upstream of said primary restrictor and a second signal line connected to said primary line downstream of said primary restrictor.

19. The system as defined in claim 17, wherein said control circuit means includes a shuttle valve means connected to an actuating line, said shuttle valve line, and said first signal line for permitting fluid communication between said first signal line and said actuating line when the pressure in the first signal line is greater than the pressure in the shuttle valve line and for permitting fluid communication between said shuttle valve line and said actuating line when the pressure in said shuttle valve line is greater than in said first signal line.

20. The system as defined in claim 19, wherein said control circuit means includes a high speed shut-off means being responsive to fluid pressure in said control line for maintaining said variable displacement pump in a zero destroked position when said speed control pump is operating above a predetermined speed.

21. The system as defined in claim 20, wherein said high speed shut-off means includes a shut-off valve body being connected at a first end to said limiting line and at a second end to a reservoir, said second end further including a shutoff spring, a shut-off plunger means being biased towards said first end by said shut-off spring and by fluid in said limiting line towards said second end for permitting fluid flow from a destroke line into a chamber line and from a reservoir line into said reservoir when the force of said shut-off spring is greater than the force of fluid in said limiting line and blocking these flows when the force of fluid in said limiting line overcomes the force of said shut-off spring.

22. The system defined in claim 21, wherein said shut-off plunger means includes a shut-off plunger having four shut-off lands, said first shut-off land is between said limiting line and said actuator line, said second land is between said actuator line and said destroke line, said third land is between said destroke line and said fourth land, and said fourth land is between said third land and said reservoir line when the shut-off plunger is biased toward said first end by said shut-off spring.

23. The system as defined in claim 18, wherein said control circuit means includes a flow control means for adjusting said variable displacement pump in response to a differential pressure across said primary restrictor so as to maintain a constant flow rate across said primary restrictor.

24. The system as defined in claim 21, wherein said control circuit means includes a flow control means for adjusting said variable displacement pump in response to a differential pressure across said primary restrictor so as to maintain a constant flow rate across said primary restrictor.

25. The system defined in claim 24, wherein saaid flow control means includes a flow control body being connected at a first end to said actuating line and at a second end to said second signal line, said second end further including a flow control spring for biasing a flow control plunger means towards said first end, said flow control plunger means for permitting unrestricted fluid flow through said actuating line, said destroke line, and said reservoir line when the pressure of fluid in said first signal line is less than the combined pressure from said flow control spring and fluid in said second signal line, and for permitting fluid to flow from said actuating line to said destroke line while interrupting the flow through said reservoir line when the pressure of fluid in said first signal line is greater than the combined pressure of said flow control spring and the fluid in said second signal line.

26. The system defined in claim 25, wherein said flow control plunger means includes a flow control plunger having three flow control plunger lands, wherein said first flow control land is located between said actuating line and said destroke line, said second flow control land is located between said destroke line and said reservoir line, and said third flow control land is located between said reservoir line and said second end when said flow control plunger is biased towards said first end by said flow control spring.

27. The system as defined in claim 17, wherein said control circuit means includes a pressure control valve means for maintaining a substantially constant torque for turning said variable displacement pump when the pressure in said actuating line is below a first value, for destroking said variable displacement pump when the pressure in said actuating line is between said first value and a second value, and for destroking said variable displacement pump to zero displacement and maintaining this condition with said speed control pump when the pressure in said actuating line is above said second value.

28. The system as defined in claim 25, wherein said control circuit means includes a pressure control valve means for maintaining a substantially constant torque for turning said variable displacement pump when the pressure in said actuating line is below a first value, for destroking said variable displacement pump when the pressure in said actuating line is between said first value and a second value, and for destroking said variable displacement pump to zero displacement and maintaining this condition with said speed control pump when the pressure in said actuating line is above said second value.

29. The system as defined in claim 28, wherein said pressure control valve means includes a pressure control valve body, said pressure control valve body being connected at one end to said actuating line and at a second end to said chamber line, said second end comprising a destroke chamber containing a servo-piston being biased towards said second end by a destroke spring, said servo-piston being connected to a rod extending to said variable displacement pump for adjusting said pump, a pressure control plunger means in said pressure control valve body for blocking flow of hydraulic fluid from said first end when the pressure in said actuating line is below a first value, and for permitting fluid communication between said actuating line and said reservoir line when the pressure in said actuating line is between said first value and a second value and for permitting fluid communication between said actuating line and said destroke line when the pressure in said actuating line is greater than said second value.

30. The system defined in claim 29, wherein said pressure control plunger means includes a pressure control plunger having two pressure control lands wherein said first pressure control land is located between said actuating line and said destroke line and said second pressure control land is located between said reservoir line and said second end of said pressure control valve body when the pressure in said actuating line is below a first value.

31. The system defined in claim 21, wherein said control line includes a secondary check means downstream of said high-speed restrictor means for prohibiting fluid flow from said reservoir line to said speed control pump when the pressure in said reservoir line is greater than the pressure in said control line.

32. The system defined in claim 29, wherein said control line includes a secondary check means downstream of said high-speed restrictor means for prohibiting fluid flow from said reservoir line to said speed control pump when the pressure in said reservoir line is greater than the pressure in said control line.

33. A hydraulic control system including:

a variable displacement pump for providing power to a work function; destroke control means for reducing the displacement of said variable displacement pump;

driving means for operating said variable displacement pump;

speed sensor means for generating a control pressure signal which is proportional to the speed of rotation of said variable displacement pump;

first pressure sensing means for developing a first pressure signal proportional to the output pressure of said variable displacement pump;

shuttle valve means connected to an actuating line and adapted to receive said control pressure signal and said first pressure signal, for comparing said control pressure signal and said first pressure signal and for permitting said actuating line to receive said first pressure signal when the difference between said control pressure signal and said first pressure signal is less than a predetermined value, and for permitting said actuating line to receive said control pressure signal when the difference between said control pressure signal and said first pressure signal exceeds a predetermined value; and high speed shut-off means connected to said actuating line and to said destroke control means and responsive to said control pressure signal to communicate said actuating line with said destroke control means for maintaining said variable displacement pump in a destroked position when said variable displacement pump is operating above a predetermined speed.

34. The system as defined in claim 33, further including:

pressure control means connected to said actuating line for maintaining a substantially constant torque for turning said variable displacement pump when the pressure in said actuating line is below a first value, for destroking said variable displacement pump when the pressure in said actuating line is between said first value and a second value and for destroking said variable displacement pump to zero displacement and maintaining this condition with said high speed shutoff means when the pressure in said actuating line is above said second value.

35. The system as defined in claim 33, further including:

primary restrictor means connected to the output of said variable displacement downstream of said first pressure sensing means;

second pressure sensing means for developing a second pressure signal proportional to the pressure downstream of said primary restrictor means; and flow control means connected to said actuating line and adapted to receive said second pressure signal for adjusting the output of said variable displacement pump in response to the difference between the pressure in said actuating line and said second pressure signal to thereby maintain a constant flow rate across said primary restrictor.

36. The system as defined in claim 35, further including:

pressure control means connected to said actuating line for maintaining a substantially constant torque for turning said variable displacement pump when the pressure in said actuating line is below a first value, for destroking said variable displacement pump when the pressure in said actuating line is between said first value and a second value and for destroking said variable displacement pump to zero displacement and maintaining this condition with said high speed shut-off means when the pressure in said actuating line is above said second value.

* * * * *